(12) United States Patent
Nukaya et al.

(10) Patent No.: US 9,033,364 B2
(45) Date of Patent: May 19, 2015

(54) SEAT CUSHION AIRBAG APPARATUS

(71) Applicant: TOYODA GOSEI CO., LTD., Kiyosu-shi, Aichi-ken (JP)

(72) Inventors: Akihiro Nukaya, Kiyosu (JP); Takanori Kanto, Kiyosu (JP); Yoshikazu Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/173,277

(22) Filed: Feb. 5, 2014

(65) Prior Publication Data

US 2014/0291973 A1 Oct. 2, 2014

(30) Foreign Application Priority Data

Mar. 26, 2013 (JP) ................................. 2013-064326

(51) Int. Cl.
*B60R 21/20* (2011.01)
*B60R 21/207* (2006.01)
*B60R 21/201* (2011.01)

(52) U.S. Cl.
CPC ............. *B60R 21/207* (2013.01); *B60R 21/201* (2013.01)

(58) Field of Classification Search
CPC .... B60R 21/237; B60R 21/207; B60R 21/20; B60R 2021/2375; B60H 1/00357; B60H 1/00271; B60H 1/00
USPC ....................... 280/728.1, 728.2, 730.1, 743.1
See application file for complete search history.

(56) References Cited

U.S. PATENT DOCUMENTS

| | | | | |
|---|---|---|---|---|
| 5,695,242 A | * | 12/1997 | Brantman et al. | 297/216.1 |
| 5,921,100 A | | 7/1999 | Yoshinori et al. | |
| 7,607,728 B2 | * | 10/2009 | Hiruta et al. | 297/216.1 |
| 7,878,589 B2 | * | 2/2011 | Murakami et al. | 297/284.11 |
| 2006/0017266 A1 | * | 1/2006 | Yoshikawa et al. | 280/730.1 |
| 2007/0132214 A1 | * | 6/2007 | Suzuki et al. | 280/730.1 |
| 2011/0193327 A1 | * | 8/2011 | Tracht et al. | 280/728.2 |
| 2012/0326420 A1 | * | 12/2012 | Katsumata | 280/730.2 |

FOREIGN PATENT DOCUMENTS

| | | |
|---|---|---|
| JP | 11-48772 A | 2/1999 |
| JP | 2002-079861 A | 3/2002 |
| JP | 2005-306252 A | 11/2005 |

\* cited by examiner

*Primary Examiner* — Ruth Ilan
*Assistant Examiner* — Darlene P Condra
(74) *Attorney, Agent, or Firm* — Posz Law Group, PLC (57) ABSTRACT

A seat cushion airbag apparatus is applied to a vehicle seat including a seat unit having a seat cushion supported, from a lower side thereof, by a supporting portion of a seat frame, and an air blowing duct having a blow-out port below the seat cushion, wherein a conditioning air flowing through the air blowing duct is blown out upward from the blow-out port. An inflator is disposed at a location, which is spaced from the blow-out port in a front and rear direction of a vehicle, and an airbag is inflated between the supporting portion and the seat cushion by an inflation gas supplied from the inflator so that a seat face of the seat unit is raised to prevent a subject to be restrained on the seat unit from being moved forward.

3 Claims, 7 Drawing Sheets

SEAT CUSHION AIRBAG APPARATUS

CROSS REFERENCE TO RELATED APPLICATION

This application is based on Japanese Patent Application No. 2013-064326 filed on Mar. 26, 2013, the contents of which are incorporated herein by reference.

BACKGROUND OF THE INVENTION

1. Technical Field

The present invention relates to a seat cushion airbag apparatus, in which an airbag disposed inside a seat unit of a vehicle seat is inflated by an inflation gas so that a seat face thereof can be raised, thereby preventing a subject to be restrained on the seat unit from being moved forward.

2. Background Art

As techniques for improving pleasant feeling of an occupant seated on a vehicle seat, for example, a 'vehicle seat air conditioning apparatus' is known from JP-A-11-048772. The vehicle seat air conditioning apparatus includes an air blowing duct having a blow-out port below a seat cushion of a seat unit, and the conditioning air (a cold air, a warm air, or the like) flowing through the air blowing duct is blown out upward from the blow-out port. The conditioning air is contacted with the occupant through the seat cushion, and thus the occupant can feel a pleasant cold or warm feeling.

Meanwhile, in a vehicle, a submarine phenomenon, in which, when an impact due to a front collision or the like is applied to the vehicle from the front, a waist region of the occupant restrained to the vehicle seat by a seat belt device may be disengaged from a lap belt portion and be moved forward (slid forward), becomes a problem. Accordingly, various measures for preventing the submarine phenomenon have been taken or proposed.

As one of such measures, a seat cushion airbag apparatus applied to a vehicle seat, in which a seat cushion as a seat unit is supported, from a lower side thereof, by a supporting portion of a seat frame, is known. The supporting portion is constituted of spring members (wire frame portions) for elastically supporting the seat cushion from the lower side thereof, engaging hooks, on which the spring members are hooked, and the like.

In the seat cushion airbag apparatus, an airbag having an inflator built therein is arranged between the supporting portion and the seat cushion (see JP-A-2002-079861 and JP-A-2005-306252). In general, the airbag is disposed in a deployed state (un-folded state). Also, the airbag is inflated by an inflation gas blown out from the inflator, thereby raising a seat face of the seat unit. Due to raising of the seat face, a part of the femoral region of the occupant, which is adjacent to a rear side of the knee region, is pressed upward so that the waist region is pressed against the lap belt portion. Thus, the performance of the lap belt portion for restraining the occupant is improved, thereby restricting the waist region from being moved forward (slid forward).

However, when the seat cushion airbag apparatus is applied to a vehicle seat in which the vehicle seat air conditioning apparatus is incorporated, the airbag in the deployed state can be located above the blow-out port, depending on a location of the blow-out port of the air blowing duct. In this case, there is a possibility: that the blow-out port is blocked by the airbag so that the conditioning air is hardly transmitted to the occupant, thereby decreasing pleasant feeling.

The above problem can similarly occur even if subjects to be restrained, which are different from the waist region of the occupant, exist on the seat unit.

Accordingly, the present invention has been made keeping in mind the above problems, and an object thereof is to provide a seat cushion airbag apparatus, in which a subject to be restrained on a seat unit can be prevented from being moved forward, while blowing out of a conditioning air from a blow-out port is not hindered.

SUMMARY OF THE INVENTION (1) According to an aspect of the invention, a seat cushion airbag apparatus is applied to a vehicle seat including a seat unit having a seat cushion supported, from a lower side thereof, by a supporting portion of a seat frame, and an air blowing duct having a blow-out port below the seat cushion, wherein a conditioning air flowing through the air blowing duct is blown out upward from the blow-out port. An inflator is disposed at a location, which is spaced from the blow-out port in a front and rear direction of a vehicle, and an airbag is inflated between the supporting portion and the seat cushion by an inflation gas supplied from the inflator so that a seat face of the seat unit is raised to prevent a subject to be restrained on the seat unit from being moved forward. A section of the airbag, which is located more toward the blow-out port than the inflator, becomes a folded portion. The folded portion before being inflated by the inflation gas is accordion-folded in a front and rear direction of the vehicle seat and is disposed at a location, which is located more toward the inflator than the blow-out port, and, the folded portion when being inflated by the inflation gas is deployed between the inflator and a location, which is located more remote from the inflator than the blow-out port.

Here, the accordion folding means a folding aspect in which the folded portion of the airbag is folded while alternately changing a folding direction thereof. In the folded portion of this aspect, a plurality of folded pieces are superimposed in the front and rear direction.

According to the above configuration (1), the folded portion before being inflated by the inflation gas is accordion-folded in the front and rear direction of the vehicle seat and is disposed at a location, which is located more toward the inflator than the blow-out port. Therefore, the blow-out port is not blocked by the folded portion, and thus the conditioning air, which flows through the air blowing duct and then is blown out upward from the blow-out port, is contacted with an occupant through the seat cushion, so that the occupant can feel a pleasant cold or warm feeling.

Meanwhile, if the inflation gas is supplied from the inflator to the airbag due to an impact on a vehicle, the airbag is deployed between the inflator and a location, which is located more remote from the inflator than the blow-out port.

In other words, the airbag is firstly inflated in a portion thereof except the folded portion, which is a portion surrounding the inflator, immediately after the inflation gas starts to be supplied from the inflator. Due to such inflation, a force directed in a direction away from the inflator in the front and rear direction is exerted on the folded portion. Due to the force, the folded portion is extruded in the direction. The inflation as described above is successively performed from one, which is close to the inflator, toward others, which are further remote therefrom, of a plurality of folded pieces of the folded portion. Due to such inflation, the un-inflated folded pieces of the folded portion are extruded in the direction away from the inflator. in this way, the inflation and the extrusion due to the inflation are successively performed from one, which is close to the inflator, toward others, which are further remote therefrom, of the plurality of folded pieces of the folded portion, and thus the folded portion is deployed. Upon deploying, the folded portion is directly or indirectly slid along a back surface of the seat cushion, but a frictional resistance generated at that time is small. The reason is that, when the folded portion is deployed, a part of the folded portion, at which the fording direction is changed, is directly or indirectly line-contacted with the back surface of the seat cushion, thereby decreasing a contact area with the seat cushion. Therefore, the extrusion due to the inflation is hardly weakened by the frictional resistance, and thus, all folded pieces of the folded portion can be easily inflated and deployed. In addition, the seat face of the seat unit is raised by the folded portion, which is being inflated and deployed as described above, and thus, the submarine phenomenon in which a subject to be restrained on the seat unit is moved forward, can he prevented.

(2) in the seat cushion airbag apparatus of (1), a contact preventing sheet for preventing the folded portion from being contacted with the supporting portion is arranged between the folded portion and the supporting portion.

According to the above configuration, with respect to the folded portion in the deployed state, as well as the folded portion in the accordion-folded state, namely regardless of forms of the folded portion, the folded portion can be prevented from being contacted with the supporting portion by the contact preventing sheet.

According to the seat cushion airbag apparatus, a subject to be restrained on the seat unit can be prevented from being moved forward, while blowing out of the conditioning air from the blow-out port is not hindered.

BRIEF DESCRIPTION OF THE DRAWINGS

FIGS. 4A and 4B are views showing one embodiment, in which

DESCRIPTION OF PREFERRED EMBODIMENT

One embodiments of a seat cushion airbag apparatus will be now described with reference to the accompanying drawings.

In the following description, a traveling direction of a vehicle is defined as a forward direction, and thus front, rear, upward, downward, left, and right directions are defined based on the forward direction. Also, in each figure, "front" represents the vehicle front side, "rear" represent the vehicle rear side, "inside" represents the vehicle inner side, and "outside" represents the vehicle outer side. The vehicle inner side means a side which is adjacent to the central location in a width direction of the vehicle, and the vehicle outer side means a side which is remote from the central location.

Also, it is assumed that an occupant (adult) having a standard body size is seated on the vehicle seat in a predetermined appropriate posture.

Figure 1:
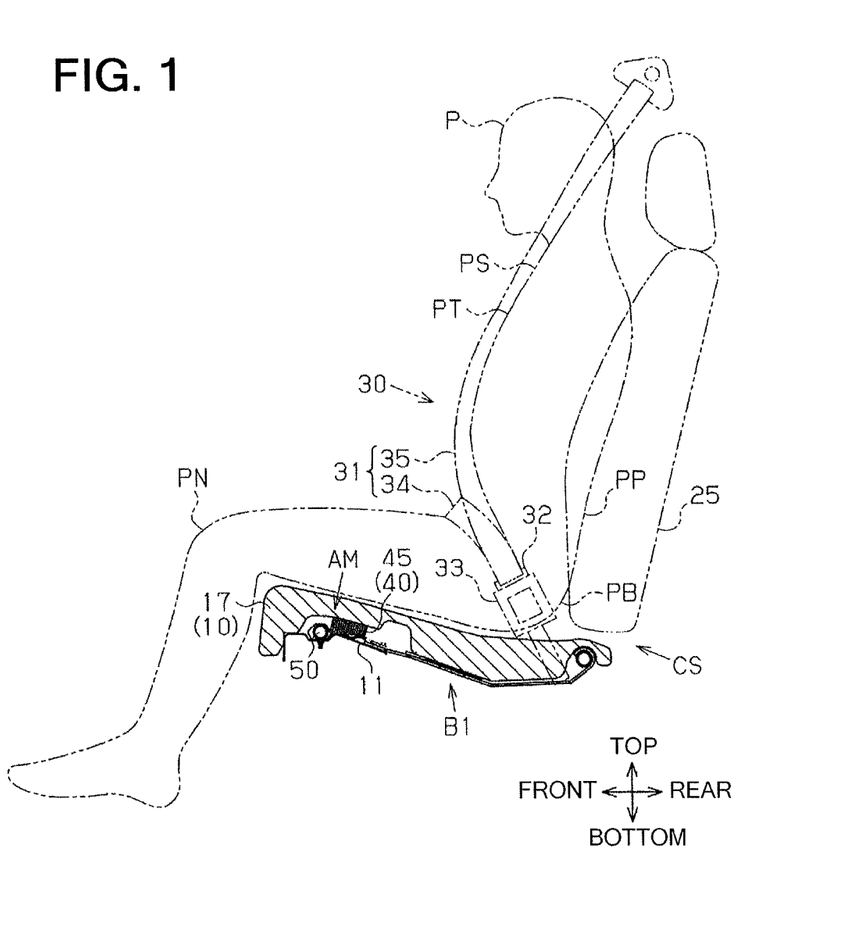
FIG. 1 is a partial side-sectional view showing, together with an occupant and a seat belt device, a vehicle seat to which one embodiment of a seat cushion airbag apparatus is applied.
Figure 2:
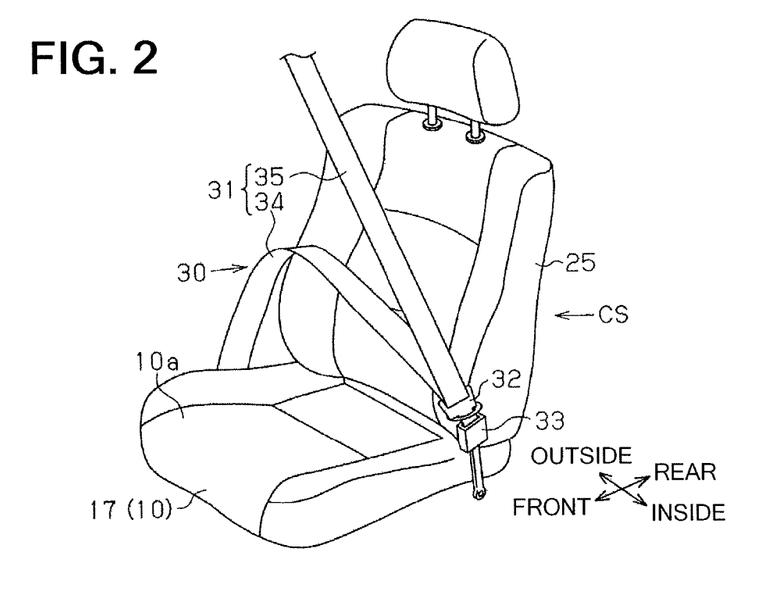
FIG. 2 is a perspective view showing a portion of the vehicle seat and seat belt device according to one embodiment.

Firstly, a schematic configuration of a vehicle seat, to which the seat cushion airbag apparatus is applied, will be described, As shown in FIGS. 1 and 2, a vehicle seat CS has a seat unit (seat cushion) 10, and a backrest unit (seat back) 25 arranged on a rear end of the seat unit 10 so that an inclination thereof can be adjusted. The seat unit 10 is a part on which an occupant P as a subject to be restrained by the seat cushion airbag apparatus (a subject to be restrained) is seated. The vehicle seat CS is arranged in the vehicle in a state where the backrest unit 25 is oriented toward the front side of the vehicle. A front and rear direction of the vehicle seat CS arranged in this way corresponds to a front and rear direction of the vehicle, and a width direction of the vehicle seat CS corresponds to a width direction of the vehicle (vehicle width direction).

Figure 3:
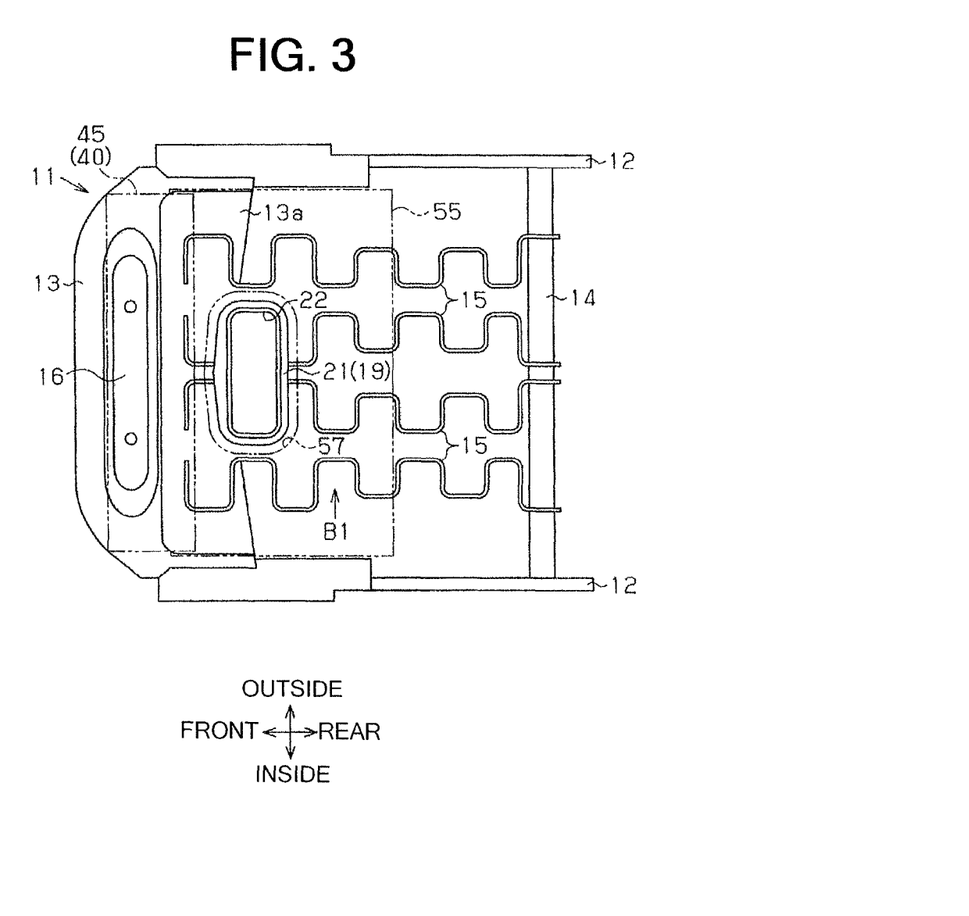
FIG. 3 is a plan view showing, together with an airbag and a contact preventing sheet, a seat frame according to one embodiment.

As shown in FIG. 3, a seat frame 11, which forms a framework of the seat unit 10, has a pair of side frame portions 12, a front frame portion 13, a rear frame portion 14, and a plurality of wire frame portions 15. Both side frame portions 12 extend in the front and rear direction of the vehicle seat CS and are arranged on parts spaced from each other in the width direction of the vehicle seat CS. The front frame portion 13 has a shape elongated in the width direction of the vehicle seat CS, and is installed between front ends of both side frame portions 12. The front frame portion 13 is provided, on a rear portion thereof, with an inclined portion 13a, which is inclined to be lowered rearward. Also, the front frame portion 13 is provided, on a front portion thereof, with a recessed portion 16, which has a shallow depth and extends in the width direction of the vehicle seat CS.

The rear frame portion 14 has a cylindrical tube shape extending in the width direction of the vehicle seat CS and is installed between rear ends of both side frame portions 12. The plurality of wire frame portions 15 serve as tension springs for improving sitting comfort, and are formed to he bent in a shape in which a series of S-shaped sections are continued to each other. The wire frame portions 15 are arranged to be spaced from each other in the width direction of the vehicle CS, and are tensioned between the front frame portion 13 and the rear frame portion 14. A rear end of each of wire frame portions 15 is hooked to the rear frame portion 14. A front end of each of wire frame portions 15 is engaged to a respective engaging hook (not shown) provided on the inclined portion 13a of the front frame portion 13. In addition, the wire frame portions 15 and the engaging hooks constitute a supporting portion 81.

Figures 4A, 4B:
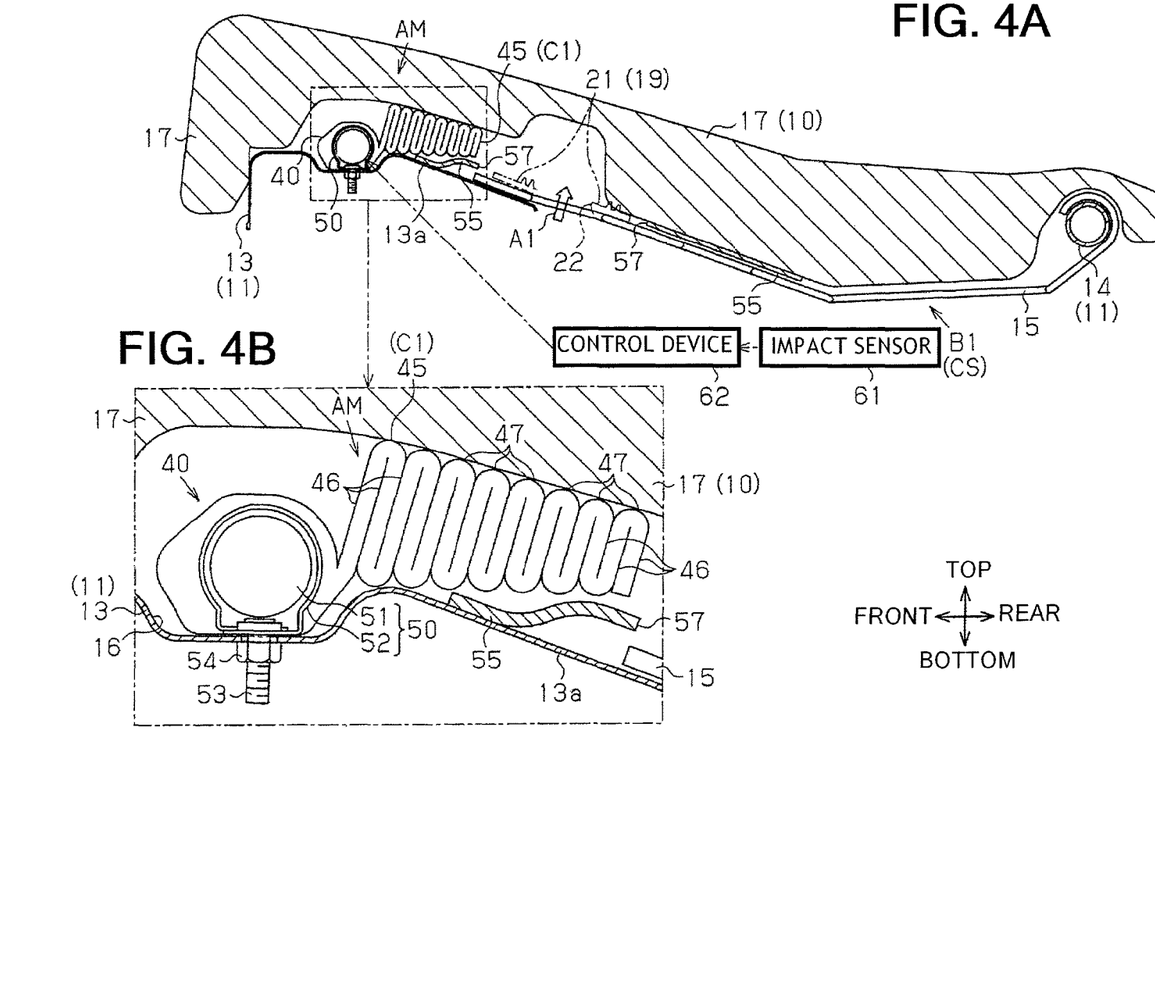
FIG. 4A is a partial side sectional view showing a sectional structure of the seat unit, to which the seat cushion airbag apparatus is applied.
FIG. 4B is an enlarged partial side sectional view showing a part of FIG. 4A.

As shown in FIGS. 4A and 4B, a seat cushion 17 is disposed on at least the supporting portion 81 of the seat frame 11. In other words, the seat cushion 17 is supported, from a lower side thereof, by the supporting portion B1 of the seat fame 11. Surfaces (an upper surface, side surfaces and the like) of the seat cushion 17 are covered with a cover (not shown) made of a fabric, a leather or the like.

As shown in FIGS. 3, 4A and 4B, an air blowing unit (not shown) and an air blowing duct 19, which is adapted to guide a conditioning air A1 supplied from the air blowing unit to a seat face 10a (see FIG. 2) of the seat unit 10, are provided inside the seat unit 10 and below the seat cushion 17. In FIGS. 3, 4A and 4B, only a part of the air blowing duct 19 is shown. A downstream portion of the air blowing duct 19 extends in an upward and downward direction, and a downward side thereof is opened in a generally rectangular ring shape. A downstream end of the air blowing duct 19 is constituted by a ring-shaped elastic member 21, which is formed in a generally rectangular ring shape by an elastic material, such as a rubber or an elastomer. The ring-shaped elastic member 21 is disposed on an upper side of the wire frame portions 15. A region on the downstream end of the air blowing duct 19, which is surrounded by the ring-shaped elastic member 21, becomes a blow-out port 2:2, In the vehicle, a seat belt device 30 as described below is provided to restrain the occupant P seated on the vehicle seat CS.

<Seat Belt Device 30>

As shown in FIGS. 1 and 2, the seat belt device 30 has a belt-shaped webbing 31 for restraining the occupant P, a tongue 32 attached to the webbing 31 to be movable along a longitudinal direction of the webbing 31, and a buckle 33 disposed on the vehicle inner side of the seat unit 10 and adapted to allow the tongue 32 to be detachably mounted thereon. One end of the webbing 31 is fixed to the vehicle outer side of the seat portion 10, and the other end thereof is adapted to be wound by a seat belt retractor (not shown) disposed on the vehicle outer side thereof. In the seat belt device 30, the tongue 32 is slid along the webbing 31, thereby changing a length of each of a lap belt portion 34 and a shoulder belt portion 35.

The lap belt portion 34 is a section of the webbing 31, which extends from the tongue 32 to an end (the fixed end) of the webbing 31, and extends from one side of a waist region PP of the seated occupant P to the other side via the front side of the waist region PP. The shoulder belt portion 35 is a section of the webbing 31, which extends from the tongue 32 to the seat belt retractor, and extends obliquely from a shoulder region PS of the seated occupant P to a lateral side of the waist region PP via the front side of a chest region PT.

In the vehicle, a seat cushion airbag apparatus (hereinafter, also simply referred to as the airbag apparatus) is provided to inhibit a submarine phenomenon. The submarine phenomenon means a phenomenon in which, when an impact due to a front collision or the like is applied to a vehicle from the front, the waist region PP of the occupant P restrained to the vehicle seat CS by the seat belt device 30 may be disengaged from the lap belt portion 34 and be moved forward (slid forward).

In FIGS. 4A and 4B, a schematic configuration of the airbag apparatus is shown. The airbag apparatus includes an airbag module AM, an impact sensor 61, and a control device 62. The airbag module AM includes an airbag 40, an inflator assembly 50, and a contact preventing sheet 55. Hereinafter, components of the airbag module AM will be described, <Airbag 40>

Figure 5A:
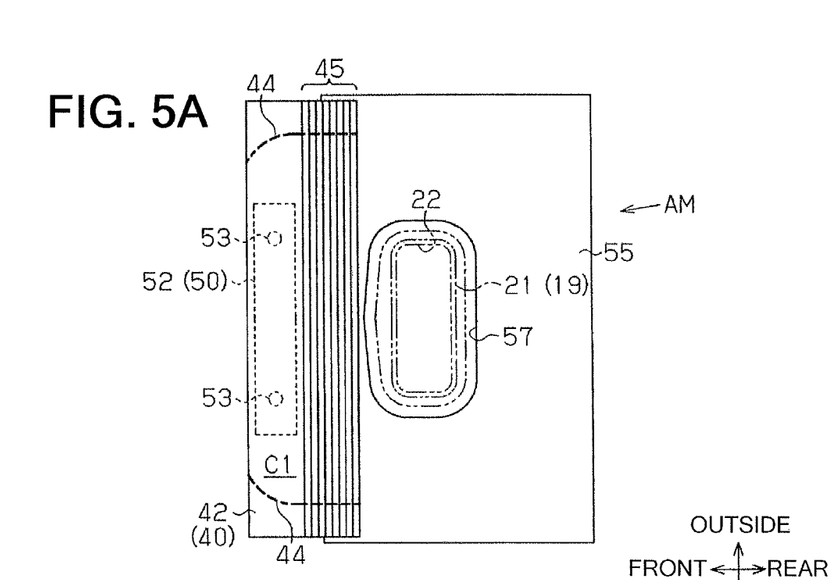
FIG. 5A is a plan view showing, together with the contact preventing sheet, the airbag in a state where a portion to be folded is folded in an accordion manner.
Figure 5B:
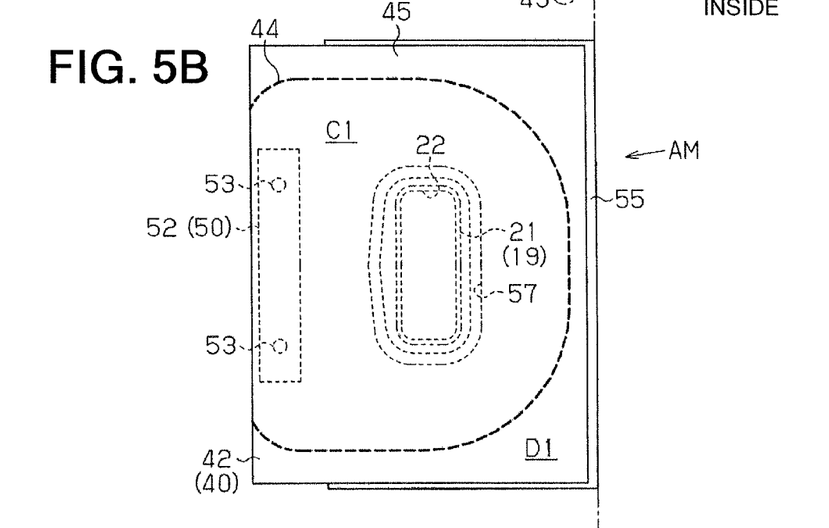
FIG. 5B is a plan view showing, together with the contact preventing sheet, the airbag in a state where the portion to be folded is deployed.

The air back 40 is formed in a sack shape by folding one fabric sheet (hereinafter, referred to as a 'base fabric 42'), which has a planar rectangular shape elongated in a front and rear direction, along a folding line 43 set in the central portion thereof to be superimposed in an upward and downward direction, as shown in FIG. 5B, and then coupling (in the present embodiment, stitching) by peripheral coupling portion 44.

The base fabric 42 is formed by a woven fabric made of polyester threads, polyamide threads or the like, and thus has high stiffness and flexibility. In the airbag 40, a section (an inside section) surrounded by the peripheral coupling portion 44 is an inflation portion C1 which is inflated by an inflation gas. Also, an outside section of the airbag 40 (a section surrounding the inflation portion C1), which is located outer than the peripheral coupling portion 44, becomes a non-inflation portion D1 which is not supplied with the inflation gas and thus is not inflated. Meanwhile, a front end of the airbag 40 is not coupled (not stitched) by the peripheral coupling portion 44.

In the present embodiment, the peripheral coupling portion 44 is shown in a thick broken line, and thus is distinguished from a normal broken line (a hidden line).

In a state where the airbag 40 is not filled with the inflation gas and thus is deployed in a flat shape so that the folding line 43 is located at a rear end thereof (hereinafter, referred to as 'non-inflated deployment state'), the front end thereof is located adjacent to a region below the knee region PN of the occupant P seated on the seat unit 10, and the rear end has a size located below a gluteal region PB (see FIG. 1).

As shown in FIGS. 5A and 5B, a section of the airbag 40, which is located more toward the blow-out port 22 than an inflator 51, is a folded portion 45. The folded portion 45 is in a folded state before the inflation portion C1 of the airbag 40 is inflated, in the present embodiment, the folded portion 45 is folded in a front and rear direction in a folding aspect referred to as an 'accordion folding'. The accordion folding means a folding aspect in which the inflation portion C1 is folded while alternately changing a folding direction thereof. When the accordion folding is performed, a plurality of folding lines (not shown), each of which extends in the width direction of the vehicle seat CS, are set at a plurality of locations on the folded portion 45 in the front and rear direction of the vehicle seat CS. A distance between the adjacent folding lines becomes a folding width in the accordion folding. Then, the folded portion 45 is successively folded in an accordion shape by the folding width along the folding lines from the front end thereof toward the rear end. In the folded portion 45, a portion between the adjacent folding lines becomes a folded piece 46. As shown in FIG, 4B, the folded portion 45 becomes a state where a plurality of folded pieces 46 are superimposed in the front and rear direction of the vehicle seat CS. Also, by accordion-folding the folded portion 45 as described above, the airbag 40 has a compact form in which a length thereof in the front and rear direction is shorter than that in the non-inflated deployment state. The folded portion 45 in the accordion-folded state is disposed at a location, which is located more toward the inflator 51 than the blow-out port 22, namely, at a location on the front side.

Also, the folded portion 45 in the accordion-folded state may be wrapped by a wrapping sheet (not shown). The wrapping sheet is intended to keep the folded portion 45 in the accordion-folded state, while the airbag module AM is transported, or before the airbag module AM is attached to the vehicle seat CS, or the like. Preferably, a breakable portion (not shown) which is adapted to be pressed and broken by the folded portion 45 when the folded portion 45 is inflated and deployed is provided in the wrapping sheet. The breakable portion may be constituted by, for example, slits formed in the wrapping sheet.

<Inflator Assembly 50>

As shown in FIG. 4B, the inflator assembly 50 has an inflator 51 as a gas generator and a retainer 52 for covering the inflator 51, The inflator 51 has a generally cylindrical shape, and contains a gas generating agent (not shown) therein. In this type of inflator 51 (a pyro type inflator), an inflation gas is generated by a chemical reaction of a gas generating agent. The inflator 51 is provided with a gas outlet (not shown) through which the generated inflation gas is blown out. A harness (not shown), which becomes a wiring for applying control signals to the inflator 51, is connected to one end of the inflator 51.

Alternatively, types other than the pyro type may be used as the inflator 51. Examples of such types include a stored gas type, in which a partition wall of a high-pressure gas cylinder filled with a high-pressure gas is broken by an explosive or the like so that the inflation gas is released, a hybrid type, in which the pyro type and the stored gas type are combined, and the like.

Most of the retainer 52 is formed in a generally cylindrical shape by bending a plate material, such as a metal plate. A plurality of downward extending bolts 53 are respectively fixed at a plurality of locations spaced from each other on a lower surface of the retainer 52.

Alternatively, the inflator 51 may have a configuration in which the retainer 52 is integrally provided therewith.

<Engagement Aspect of the Inflator Assembly 50 to the Airbag 40>

The inflator assembly 50 is positioned in a front side portion of the airbag 40 to extend in the width direction of the vehicle seat CS. Each of bolts 53 of the retainer 52 is inserted through a front and lower portion of the airbag 40. By this insertion, the inflator assembly 50 is engaged to the airbag 40. The harness of the inflator assembly 50 is withdrawn to the outside of the airbag 40 through a portion of the front end of the airbag 40, which is not stitched by the peripheral coupling portion 40.

<Contact Preventing Sheet 55>

As shown in FIGS. 4A and 4B, the contact preventing sheet 55 is intended to preventing the folded portion 4S from being contacted with the supporting portion B1, and is disposed on the supporting portion B1. The contact preventing sheet 55 is configured such that, among the supporting portion B1, particularly, pointed parts, such as hooking parts of the engaging hooks, to which the wire frame portions 15 are hooked, are not contacted with the folded portion 45.

The contact preventing sheet 55 is formed of a single sheet. For example, one obtained by laminating a felt onto a soft resin sheet made of a synthetic resin, such as polyethylene, may be used as the contact preventing sheet 55. Regardless of weaving or knitting fibers, the felt is formed in a fabric shape by causing fibers themselves to be tangled, and has high flexibility.

As shown in FIGS. 4A, 4B, 5A and 5B, the contact preventing sheet 55 has a planar rectangular shape and a width thereof in the width direction of the vehicle sheet CS is slightly wider than the airbag body 40. A front end of the contact preventing sheet 55 is arranged on the inclined portion 13a of the front frame portion 13, and a rear end thereof is arranged at the same location as that of the rear end of the folded portion 45 in the non-inflated deployment state, or at a location slightly rearward therefrom (in the vicinity of the rear side portion of the seat cushion 17).

The contact preventing sheet 55 is arranged such that the felt becomes an upper side thereof (a side facing the airbag 50) and the resin sheet becomes a lower side (a side facing the support portion B1). The contact preventing sheet 55 is coupled to a plurality of locations on the non-inflation portion D1 by means such as thermal welding. In a section of the contact preventing sheet 55, which is located above the blow-out port 22 of the air blowing duct 19, a vent hole 57 slightly larger than the blow-out port 22 is opened.

As described above, the airbag module AM constituted of the airbag 40, in which the folded portion 45 is accordion-folded, the inflator assembly 50, the contact preventing sheet 55 and the like is arranged and mounted in the seat unit 10 of the vehicle seat CS in the following aspect.

<Arrangement Aspect of the Airbag Module AM>

As shown in 4A and 4B, the airbag module AM is arranged such that a portion (lower portion) of the front section of the airbag 40, in which the inflator assembly 50 is arranged, is received in the recessed portion 16 of the front frame portion 13. According to such an arrangement of the airbag module AM, the contact preventing sheet 55 is disposed above the supporting portion B1 and over a large region extending from a location, which is adjacent to a rear side of the recessed portion 16, to a location, which is adjacent to the rear side portion of the seat unit 10. The vent hole 57 of the contact preventing sheet 55 is located above the blow-out port 22 of the air blowing duct 19. The folded portion 45 in the accordion-folded state is located more toward the inflator 51 (the front side) than the blow-out port 22.

<Mounting Aspect of the Airbag Module AM>

Each of bolts 53, which are exposed downward from a front and lower portion of the airbag 40, is inserted through a bottom of the recessed portion 16. By screwing a nut 54 on each of bolts 53, the inflator assembly 50 together with the airbag 40 is fastened to the front frame portion 13.

As described above, the airbag apparatus has an impact sensor 61 and a control device 62, in addition to the airbag module AM. The impact sensor 61 is constituted by an acceleration sensor or the like, and is attached to a front bumper (not shown) of the vehicle. To detect a front collision of the vehicle, the impact sensor 61 is adapted to detect an impact applied from the front of the vehicle to the front bumper or the like. The control device 62 controls an operation of the inflator 51 based on a signal detected from the impact sensor 95.

The airbag apparatus of the present embodiment is constructed as described above. Next, operations of the airbag apparatus will be described.

In the airbag apparatus, if an impact due to a front collision or the like is not applied from the front to the vehicle, a command signal for activating the inflator 51 is not outputted from the control device 62 to the inflator 51, and thus inflation gas is not supplied from the inflator 51 to the airbag 40. As shown in FIGS. 4A and 4B, the folded portion 45 of the airbag 40 continues to be disposed at a location, which is located more toward the inflator 51 than the blow-out port 22 of the air blowing duct 19, in a state where the folded portion 45 is accordion-folded between the supporting portion B1 and the seat cushion 17. Therefore, the blow-out port 22 is not blocked by the folded portion 45. Also, although the contact preventing sheet 55 is disposed on the supporting portion B1 in a flatly deployed state without being folded, the vent hole 57 is located above the blow-out port 22. Therefore, the blow-out port 22 is not also blocked by the contact preventing sheet 55. The conditioning air A1, which flows through the air blowing duct 19 and then is blown out upward from the blow-out port 22, is contacted with the occupant P through the seat cushion 17. Due to the conditioning air A1, the occupant P can feel a pleasant cold or warm feeling.

In this case, the folded portion 45 is prevented from being contacted with the supporting portion Si by the contact preventing sheet 55.

Meanwhile, when an impact due to a front collision of the vehicle or the like is applied from the front to the vehicle, the inertia attempts to move the occupant P forward. The occupant P is retained onto the seat unit 10 by a retention action of the seat belt device 30. There is, however, a case where, depending on the posture of the occupant P, the waist region PP is disengaged from the lap belt portion 34 and moves forward.

However, when an impact having a magnitude greater than a predetermined value is applied thereto due to an impact from the front and thus this is detected by the impact sensor 61, the command signal for activating the inflator 51 is outputted from the control device 62 to the inflator 51 through the harness, based on the detected signal. In response to the command signal, the inflator 51 generates and discharges high-temperature and high-pressure inflation gas.

Figure 6A:
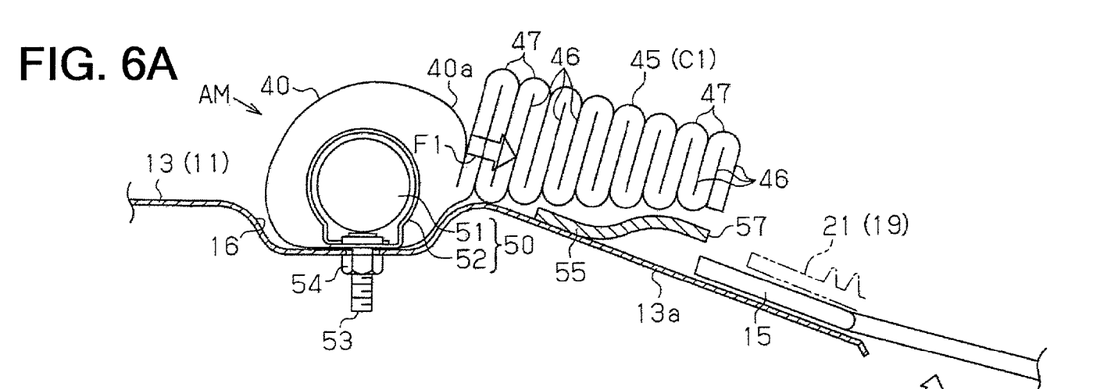
FIGS. 6A and 6B are partial side sectional views showing a state where the portion to be folded is inflated and deployed.
Figure 6B:
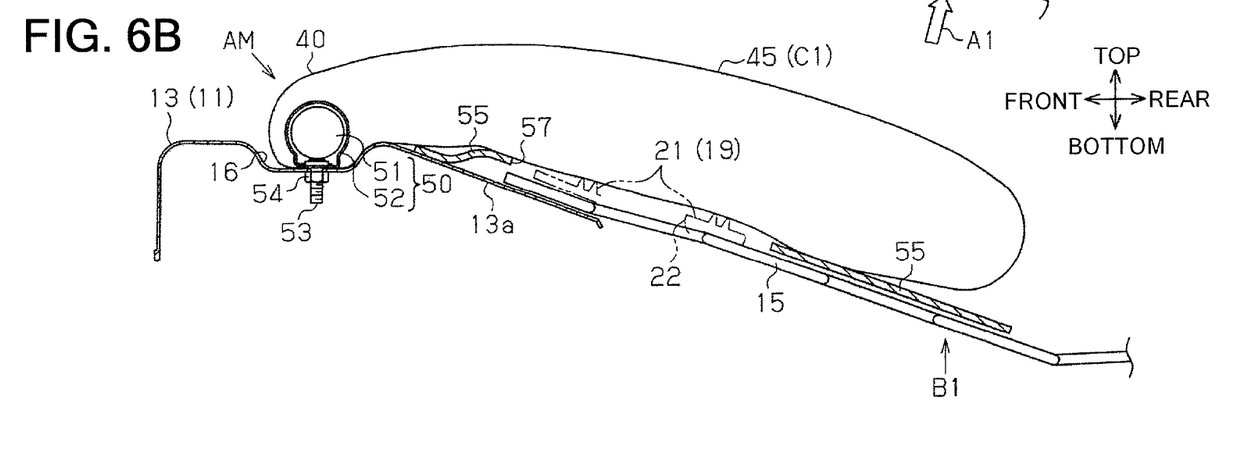

Also, as shown in FIG. 6B, as the inflation gas is supplied from the inflator 51, the airbag 40 (the inflation portion C1) is inflated to be deployed between the supporting portion B1 and the seat cushion 17 and also between the inflator 51 and a location, which is located more remote from the inflator 51 than the blow-out port 22.

Figure 7A:
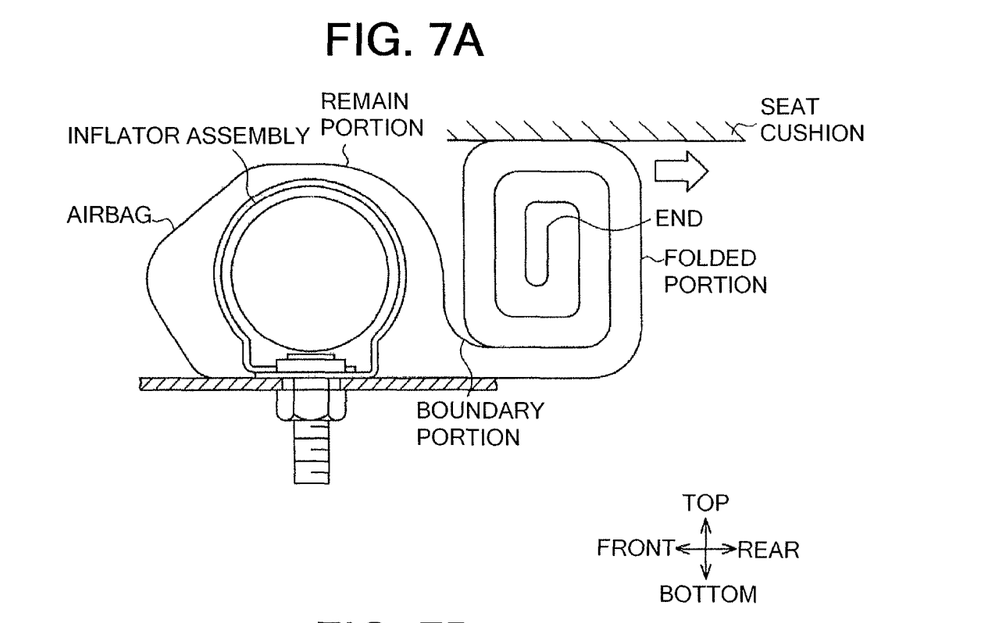
FIG. 7A is a partial side sectional view showing a comparative example in which a portion to be folded is folded in a roll manner.

In this case, one of folding aspects of the folded portion 45 is roll-folding as shown in FIG. 7A. The roll-folding means a folding aspect in which, around an end of the folded portion of the airbag, the other part thereof is wounded in a spiral shape.

Aspects of the roll-folding can includes an aspect, in which a boundary portion between the folded portion of the airbag and the remainder portion thereof, which covers the inflator assembly, is located below the folded portion as shown in FIG. 7A, and an aspect, in which the boundary portion is located above the folded portion (not shown). In the case of the latter, the folded portion is deployed along the supporting portion when the folding is released. Upon deploying, there is a possibility that the folded portion is contacted with pointed parts or the like on the supporting portion.

Thus, the folded portion is roll-folded into the aspect as shown in FIG. 7A. In this case, a phenomenon, in which the folded portion is contacted with pointed parts or the like on the supporting portion, is prevented, and also, upon deploying, the folded portion is slid along a hack surface of the seat cushion. A frictional resistance generated during the sliding is relatively large. The reason is that, when the folded portion is deployed, the folded portion is rolled in contact with the seat cushion to release folding, namely, the folded portion is surface-contacted with the seat cushion to increase a contact area with the seat cushion. Therefore, there is a possibility that releasing (deploying) of folding of the folded portion is hindered by the friction resistance, thereby weakening momentum of deployment.

Figure 7B:
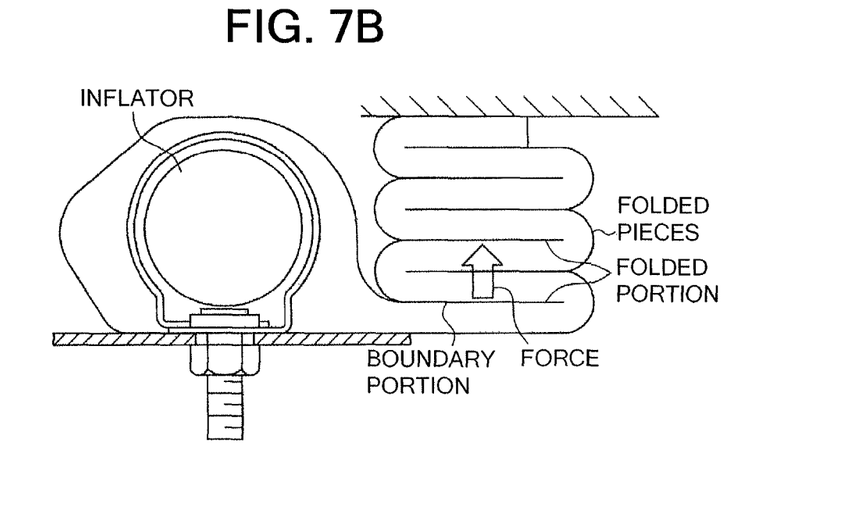
FIG. 7B is a partial side sectional view showing a comparative example in which a portion to be folded is folded in an upward and downward direction in an accordion manner.

Also, another folding aspect of the folded portion is accordion-folding in the upward and downward direction as shown in FIG. 7B. In this folding aspect, a boundary portion with respect to the folded portion, which is also a portion surrounding the inflator, is firstly inflated immediately after the inflation gas starts to be supplied from the inflator. Due to such inflation, a force directed upward as shown by an arrow is exerted on a plurality of folded pieces of the folded portion. Thus, there is a possibility that inflation and deployment of the folded portion rearward is weakened as much as the force.

Contrarily, in the folding aspect of the present embodiment (according-folding in the front and rear direction), as shown in FIG. 6A, the airbag 40 (the inflation portion C2 is firstly inflated in a boundary portion 40a with respect to the folded portion 45, which is also a portion surrounding the inflator 51, immediately after the inflation gas starts to be supplied from the inflator Si. Due to such inflation, a force F1 directed in a direction (rear direction) away from the inflator 51 in the front and rear direction is exerted on the folded portion 45. Due to the force F1, the folded portion 45 is extruded in the rear direction. The inflation as described above is successively performed from one, which is close to the inflator 51, toward others, which are further remote therefrom, of the plurality of folded pieces 46 of the folded portion 45. Due to such inflation, the un-inflated folded pieces 46 of the folded portion 45 are extruded in the direction (rear direction) away from the inflator 51. In this way, the inflation and the extrusion due to the inflation are successively performed from one, which is close to the inflator 51, toward others, which are further remote therefrom, of the plurality of folded pieces 46 of the folded portion 4S, and thus the folded portion 45 is deployed as shown in FIG. 6B. Upon deploying, the folded portion 45 is slid along a back surface of the seat cushion 17, but a frictional resistance generated at that time is small. The reason is that, when the folded portion 45 is deployed, a part (a boundary part 47 between the adjacent folded pieces 46) of the folded portion 45, at which the fording direction is changed, is line-contacted with the back surface of the seat cushion 17, thereby decreasing a contact area with the seat cushion 17. Therefore, the extrusion due to the inflation is hardly weakened by the frictional resistance, and thus, all folded pieces 46 of the folded portion 45 can be easily inflated and deployed.

Meanwhile, when the wrapping sheet is used, the wrapping sheet is pressed by the folded portion 45, which is being inflated and deployed, and thus is broken at the breakable portion.

The seat cushion 17 is pushed up by the folded portion 45, and thus the seat face 10a of the seat unit 10 is raised. A region from a rear side of the knee region PN to the gluteal region PB of the occupant P, who is restrained on the vehicle seat CS by the seat belt device 30, is pressed upward by the raised seat face 10a. Particularly, the waist region PP of the occupant P, who is pushed up by such pressing, is pressed against the lap belt portion 34 of the seat belt device 30, thereby increasing a restraining force of the lap belt portion 34. The submarine phenomenon, in which the waist region PP of the occupant P is moved forward on the seat unit 10, is prevented. Particularly, because the folded portion 45 is successively inflated from the front side thereof toward the rear side as described above, the seat face 10a is also raised in the corresponding order, so that the knee region PN of the seated occupant P is firstly lifted. Therefore, generation of the submarine phenomenon can be appropriately prevented.

Also, when the folded portion 45 is inflated and deployed as described above, the contact preventing sheet 55 prevents the folded portion 45 from being contacted with the supporting portion 131, similarly to the non-inflation state.

In addition, because the contact preventing sheet 55 is disposed in a flatly deployed state without being folded, the contact preventing sheet 55 hardly hinders deployment and inflation of the folded portion 45, compared to a case in which the contact preventing sheet 55 is deployed together with the folded portion 45.

According to the present embodiment described in detail above, the following effects are achieved.

(1) The airbag apparatus is applied to the vehicle seat CS, in which the air blowing duct 19 having the blow-out port 22 is provided below the seat cushion 17 and the conditioning air A1 flowing through the air blowing duct 19 is blown out upward from the blow-out port 22. In the airbag 40 of the airbag apparatus, a section, which is located more toward the blow-out port 22 than the inflator 51, is the folded portion 45. Before being inflated by the inflation gas, the folded portion 45 is accordion-folded in a front and rear direction, and is disposed at a location, which is located more toward the inflator 51 than the blow-out port 22, and the folded portion 45 when being inflated is deployed between the inflator 51 and a location, which is located more remote from the inflator 51 than the blow-out port 22 (see FIGS. 4A and 4B).

Therefore, the blow-out port 22 of the air blowing duct 19 cannot be blocked by the folded portion 45 before being inflated. Also, the seat cushion 17 can be pushed up by the folded portion 45, which is being inflated and deployed, thereby raising the seat face 10a of the seat unit 10. As a result, the submarine phenomenon, in which the waist region PP of the occupant P is moved forward (slid forward) on the seat unit 10, can be prevented, while blowing out of the conditioning air A1 from the blow-out port 22 is not hindered.

(2) The contact preventing sheet 55 for preventing the folded portion 45 from being contacted with the supporting portion B1 is arranged between the folded portion 45 and the supporting portion B1 (see FIG. 4A and 4B).

Therefore, the folded portion 45 in the deployed state, as well as the folded portion 45 in the accordion-folded state, can be prevented from being contacted with the supporting portion B1 by the contact preventing sheet 55. As a result, regardless of forms of the folded portion 45, the folded portion 45 can be prevented from being damaged by contact with pointed parts or the like of the supporting portion B1, In addition, the contact preventing sheet 55 can be easily handled because the contact preventing sheet 55 is one of components of the airbag module AM and is coupled to the airbag 40 (the non-inflation portion D1). Upon mounting, the airbag module AM, the airbag module AM can be arranged such that the front side portion of the airbag 40 is received in the recessed portion 16 of the front frame portion 13, thereby arranging the contact preventing sheet 55 at a predetermined location above the supporting portion B1.

Meanwhile, the foregoing embodiment may be modified as in the following variants.

<Airbag 40>

The airbag 40 may be formed by folding a plurality of sheets of fabric, which are superimposed on top of one another, along a common folding line set in the central portion thereof to be stacked in an upward and downward direction, and then coupling by the peripheral coupling portion 44.

The airbag 40 may be formed by coupling a few sheets of fabric, which are superimposed on top of one another but not folded, by the peripheral coupling portion 44, The airbag 40 may be configured such that the substantial whole thereof becomes the inflation portion C1.

A folding width of each of folded pieces 46 of the folded portion 45 may be uniform or non-uniform.

The inflation portion C1 may be configured such the inside thereof is partitioned into a plurality of rooms.

<Peripheral Coupling Portion 44>

The peripheral coupling portion 44 may be formed by aspects other than stitching using threads, such as adhesion using adhesives, welding or the like. <Contact Preventing Sheet 55>

The contact preventing sheet 55 may be entirely formed of a felt, or entirely formed of a soft resin sheet. Also, instead of a felt and a soft resin sheet described above, the contact preventing sheet 55 may be formed of a different material, such as fabric, paper, or cushioning material.

The contact preventing sheet 55 may be fixed to the inflation portion C1 of the airbag 40, and also may be fixed to both of the inflation portion C1 and the non-inflation portion D1.

The contact preventing sheet 55 may be formed of a plurally of sheets. In this case, the contact preventing sheet 55 may be provided only on parts of the folded portion 45, which are likely to be especially damaged by contact with the support portion B1.

The contact preventing sheet 55 may be fixed to the airbag 40 by fixing means other than thermal welding.

The contact preventing sheet 55 may he locked to the supporting portion B1, in addition to, or alternative to the folded portion 45.

The contact preventing sheet 55 may be appropriately omitted.

<Others>

The seat cushion airbag apparatus may be also applied to a vehicle seat CS in which the blow-out port 22 of the air blowing duct 19 is located at a location different from that in the foregoing embodiment, for example, more rearward than that in the embodiment. Further, the seat cushion airbag apparatus may be applied to a vehicle seat CS, in which a plurality of blow-out ports 22 are provided.

The seat cushion airbag apparatus may be applied to a vehicle seat CS, in which a back surface material is provided on a back surface of a seat cushion 17. The back surface material is intended to restrict the seat cushion 17 from being contacted with the seat frame 11. In this case, the airbag 40 is arranged between the supporting portion B1 and the back surface material.

In this way, when each of folded pieces 46 of the folded portion 45 in the accordion-folded state is inflated and deployed, the folded portion 45 is slid along the back surface material to be indirectly slid relative to the back surface of the seat cushion 17, but a frictional resistance generated at that time is small. The reason is that, when the folded portion 45 is deployed, a part (the boundary part 47 between the adjacent folded pieces 46) of the folded portion 45, at which the fording direction is changed, is line-contacted with the back surface material, thereby decreasing a contact area with the back surface material.

In this case, the back surface material provided on the back surface of the seat cushion 17 is typically formed of a felt, a coarse blanket, a non-woven fabric or the like. The back surface material is rougher than the back surface of the seat cushion 17, and accordingly, the frictional resistance against the folded portion 45 is greater than when the back surface material does not exist. Thus, compared to a case where the folded portion 45 is folded in a folding aspect, in which a contact area with the back surface material is large, benefits of a small contact area is further increased, and thus, all folded pieces 46 of the folded portion 45 can be easily inflated and deployed.

Other than the occupant P, for example a piece of baggage or the like may be a subject to be restrained by the seat cushion airbag apparatus. In a case where a piece of baggage or the like is placed as a subject to be restrained on the seat unit 10, the same advantages as those in the foregoing embodiment are achieved.

The seat cushion airbag apparatus may be also applied to a vehicle seat CS arranged in a vehicle so that, when an occupant P is seated thereon, the occupant P is oriented in a direction other than the front and rear direction of the vehicle, such as a direction perpendicular thereto (a vehicle width direction). In addition, the seat cushion airbag apparatus may be applied to any of a plurality of vehicle seats CS arranged inside the vehicle compartment in the front and rear direction.

The seat cushion airbag apparatus may be also applied to a vehicle seat CS, in which instead of the wire frame portions 15, a seat pan, which is a member having a plate shape, is used as the supporting portion B1, and the seat cushion 17 is supported by the seat pan.

What is claimed is:

1. A seat cushion airbag apparatus adapted to be applied to a vehicle seat including a seat unit having a seat cushion supported, from a lower side thereof, by a supporting portion of a seat frame, and an air blowing duct having a blow-out port below the seat cushion, wherein a conditioning air flowing through the air blowing duct is blown out upward from the blow-out port, wherein an inflator is disposed at a location, which is spaced from the blow-out port in a front and rear direction of a vehicle, and an airbag is inflated between the supporting portion and the seat cushion by an inflation gas supplied from the inflator so that a seat face of the seat unit is raised to prevent a subject to be restrained on the seat unit from being moved forward, and wherein a section of the airbag, which is located more toward the blow-out port than the inflator, becomes a folded portion, wherein the folded portion before being inflated by the inflation gas is accordion-folded in a front and rear direction of the vehicle seat and is disposed at a location, which is located more toward the inflator than the blow-out port, and, the folded portion when being inflated by the inflation gas is deployed between the inflator and a location, which is located more remote from the inflator than the blow-out port, wherein the airbag is inflated in an inflation direction, and the folded portion is accordion-folded in a direction crossing the inflation direction such that folding directions are changed alternately.

2. The seat cushion airbag apparatus according to claim 1, wherein a contact preventing sheet for preventing the folded portion from being contacted with the supporting portion is arranged between the folded portion and the supporting portion.

3. The seat cushion airbag apparatus according to claim 2, wherein the contact prevention sheet has a width larger than the airbag in a left and right direction of the vehicle seat.

* * * * *